US011932832B2

(12) United States Patent
Braeckman et al.

(10) Patent No.: US 11,932,832 B2
(45) Date of Patent: Mar. 19, 2024

(54) LIQUID HAND DISHWASHING DETERGENT COMPOSITION

(71) Applicant: The Procter & Gamble Company, Cincinnati, OH (US)

(72) Inventors: Karl Ghislain Braeckman, Gerpinnes (BE); Jeremie Robert Marcel Gummel, Brussels (BE); Christopher Hebden Nunn, Egham (GB); Pieter Jan Maria Saveyn, Destelbergen (BE); Jonathan Richard Stonehouse, Windlesham (GB); Mauro Vaccaro, Brussels (BE)

(73) Assignee: The Procter & Gamble Company, Cincinnati, OH (US)

( * ) Notice: Subject to any disclaimer, the term of this patent is extended or adjusted under 35 U.S.C. 154(b) by 131 days.

(21) Appl. No.: 17/066,597

(22) Filed: Oct. 9, 2020

(65) Prior Publication Data

US 2021/0108158 A1 Apr. 15, 2021

(30) Foreign Application Priority Data

Oct. 10, 2019 (EP) .................................... 19202433
Apr. 7, 2020 (EP) .................................... 20168365
Apr. 7, 2020 (EP) .................................... 20168369

(51) Int. Cl.

| | |
|---|---|
| ***C11D 1/02*** | (2006.01) |
| ***C11D 1/12*** | (2006.01) |
| ***C11D 1/14*** | (2006.01) |
| ***C11D 1/29*** | (2006.01) |
| ***C11D 1/72*** | (2006.01) |
| ***C11D 1/722*** | (2006.01) |
| ***C11D 1/75*** | (2006.01) |
| ***C11D 1/83*** | (2006.01) |
| ***C11D 1/835*** | (2006.01) |
| ***C11D 1/88*** | (2006.01) |
| ***C11D 1/94*** | (2006.01) |
| ***C11D 3/37*** | (2006.01) |
| *C11D 1/48* | (2006.01) |
| *C11D 1/90* | (2006.01) |

(52) U.S. Cl.

CPC .......... *C11D 3/3707* (2013.01); *C11D 1/8355* (2013.01); *C11D 1/945* (2013.01); *C11D 1/48* (2013.01); *C11D 1/72* (2013.01); *C11D 1/722* (2013.01); *C11D 1/75* (2013.01); *C11D 1/90* (2013.01); *C11D 2111/14* (2024.01)

(58) Field of Classification Search

CPC .... C11D 1/02; C11D 1/12; C11D 1/14; C11D 1/29; C11D 1/665; C11D 1/72; C11D 1/722; C11D 1/75; C11D 1/8255; C11D 1/83; C11D 1/8305; C11D 1/88; C11D 3/3707

See application file for complete search history.

(56) References Cited

U.S. PATENT DOCUMENTS

| | | | | |
|---|---|---|---|---|
| 4,904,359 | A | 2/1990 | Pancheri et al. | |
| 10,844,336 | B2 * | 11/2020 | Brouwers | C11D 3/3723 |
| 11,155,770 | B2 * | 10/2021 | Delplancke | C11D 3/3707 |
| 11,427,793 | B2 * | 8/2022 | Brouwers | A47K 5/122 |
| 2003/0064900 | A1 | 4/2003 | Borgonjon | |
| 2005/0272619 | A1 | 12/2005 | Borgonjon | |
| 2006/0105936 | A1 * | 5/2006 | Shi | C11D 1/83 510/503 |
| 2019/0161703 | A1 * | 5/2019 | Delplancke | C11D 3/3723 |

FOREIGN PATENT DOCUMENTS

| | | |
|---|---|---|
| EP | 3489336 B1 | 5/2020 |
| WO | 9856884 A1 | 12/1998 |

OTHER PUBLICATIONS

Basf Lutensol XP and Lutensol XL, "Nonionic Surfactants for Household and I&I Cleaners Formulations", dated Dec. 1, 2005, XP055452145, URL:https://worldaccount. basf.com/wa/NAFTA/ Catalog/ChemicalsNAFTA/ doc4/BASF/P RD/30 163866/. pdf? asset_type=pi/ pdf&language=E N&urn=urn :documentum :eCommerce_sol_EU, retrieved on Feb. 16, 2018, p. 4.

European Search Report for Application No./Patent No. 19202433. 9-1105, dated Mar. 18, 2020, 7 pages.

European Search Report for Application No./Patent No. 20168365. 3-1105, dated Aug. 3, 2020, 8 pages.

European Search Report for Application No./Patent No. 20168369. 5-1105, dated Aug. 3, 2020, 8 pages.

* cited by examiner

*Primary Examiner* — Brian P Mruk

(74) *Attorney, Agent, or Firm* — Carolyn S. Powell; George H. Leal

(57) ABSTRACT

The need for a liquid hand-dishwashing composition which provides further improved sudsing volume and longevity when washing dishware, especially at elevated temperatures, using diluted liquid hand dishwashing compositions, and especially in the presence of greasy soil and particulate soil, while avoiding unsightly residues on dishware, is met by combining a sudsing surfactant system with an EO-PO-EO triblock copolymer and a highly ethoxylated nonionic surfactant.

20 Claims, No Drawings

LIQUID HAND DISHWASHING DETERGENT COMPOSITION

FIELD OF THE INVENTION

The present invention relates to a liquid hand dishwashing detergent composition comprising a surfactant system, at least one EO-PO-EO triblock co-polymer, and a highly ethoxylated nonionic surfactant.

Hand dishwashing detergent compositions should have good sudsing profile while providing good greasy soil cleaning. A lack of sudsing can lead the user to have the impression that the dish composition has become saturated with dirt and is no longer effective at cleaning, especially when used in full sink wash conditions. That is, when the liquid hand dishwashing detergent has been diluted in water in a sink or similar receptacle, in which the soiled dishes are washed.

As described in European applications 18207430.2, 18196142.6 and 17203791.3, improved sudsing profile can be achieved through the use of ethyleneoxide (EO)-propyleneoxide (PO)-ethyleneoxide (EO) triblock co-polymers. Such polymers have also been found to improve sudsing even in the presence of greasy soils. However, it has been found that when such liquid hand dishwashing detergents are diluted in relatively hot water to form a dishwashing liquor, an increase in detergent residues on the washed plates has been observed, resulting in unsightly residues and increased haziness of the dishes. Such residues and haziness can result in an impression that the dishes have not been sufficiently well cleaned.

Thus, a need remains for a hand dish washing detergent composition which provides a good sudsing profile, in particular enhanced suds volume and/or enhanced suds stabilization during full sink washing conditions, while also preventing unsightly residues or haziness on the washed dishes, regardless of the temperature at which the dishes have been washed.

European applications 17203791.3 relates to a hand dishwashing detergent composition including a surfactant system; at least one triblock co-polymer; and an amphiphilic alkoxylated polyalkyleneimine U.S. Pat. No. 4,904,359A relates to high sudsing liquid detergent compositions containing anionic surfactant and polymeric surfactant which contains ether linkages, the anionic surfactant forming stable complexes with the polymeric surfactant for improved grease handling. EP2014753A relates to a stable liquid detergent composition having a pH comprised between 7.5 and 8.4 and comprising an alkyl ethoxy sulfate surfactant, an amine oxide surfactant and a polyethyleneimine polymer to provide improved grease cleaning and sudsing and to reduce solution slipperiness.

EP3489336A relates to a hand dishwashing detergent composition including a surfactant system and at least one triblock co-polymer of Formula (I): (EO)x-(PO)y-(EO)x wherein each x is independently on average between 1 and 40, preferably between 3 and 35, more preferably between 3 and 30, even more preferably between 3 and 20, most preferably between 3 and 10, and y is on average between 1 and 15, preferably between 5 and 15. US2006105936A relates to a liquid detergent composition having mid-branched amine oxides and C10-C14 alkyl or hydroxyalkyl sulphate or sulphonate surfactants to provide improved low temperature grease cleaning. US2005272619A relates to a detergent composition having viscosity of at least 700 cps, measured using the standard Brookfield viscometer method at 20° C., and comprising from 0.1% to 3% by weight of the composition of an organic salt, inorganic salt or mixtures thereof and from 0.05% to 10% by weight of the composition of a hydrophobic block copolymer having average molecular weight of at least 500 and comprising alkylene oxide moieties.

SUMMARY OF THE INVENTION

The present invention relates to a liquid hand dishwashing cleaning composition comprising: from 5% to 50% by weight of the total composition of a surfactant system; and from 0.1% to 5.0% by weight of the total composition of at least one ethyleneoxide (EO)-propyleneoxide (PO)-ethyleneoxide (EO) triblock co-polymer of Formula (I):

$$(EO)_x\text{-}(PO)_y\text{-}(EO)_x \quad \text{(I)}$$

wherein: each x is independently on average between 3 and 50; and y is on average between 5 and 60; and from 0.1% to 10% by weight of the total composition of an alkyl ethoxylated nonionic surfactant of formula: R1(PO)n(EO)mOH, wherein: R1 is a C6 to C22 alkyl chain; m is a number average of from 10 to 50, and n is a number average of from 0 to 6, with the proviso that the ratio of m:n is greater than 2 if n is greater than 0, wherein in the alkyl ethoxylated nonionic surfactant of formula (II), R1 is branched and selected from the group consisting of:

i. R1 is (III a)

R1 is 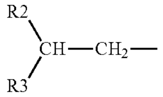

wherein R2 is a C3 to C11, preferably C4 to C9, more preferably C4 to C7 alkyl chain; R3 is a C1 to C9, preferably C2 to C7, more preferably C2 to C5 alkyl chain; with the proviso that R2 comprises 2 more carbon atoms than R3;

ii. R1 is (IV a)

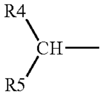

wherein: R4 is a C4 to C11, preferably C5 to C10, more preferably C4 to C10 alkyl chain; R5 is a C1 to C10, preferably C1 to C7, more preferably C3 to C7 alkyl chain; and mixtures thereof.

The present invention relates to a liquid hand dishwashing cleaning composition comprising: from 5% to 50% by weight of the total composition of a surfactant system; and from 0.1% to 5.0% by weight of the total composition of at least one ethyleneoxide (EO)-propyleneoxide (PO)-ethyleneoxide (EO) triblock co-polymer of Formula (I):

$$(EO)_x\text{-}(PO)_y\text{-}(EO)_x \quad \text{(I)}$$

wherein: each x is independently on average between 3 and 50; and y is on average between 20 and 60; and from 0.1% to 10% by weight of the total composition of an alkyl ethoxylated nonionic surfactant of formula: R1(PO)n(EO)mOH, wherein: R1 is a C6 to C22 alkyl chain; m is a number average of from 10 to 50, and n is a number average of from 0 to 6, with the proviso that the ratio of m:n is greater than 2 if n is greater than 0.

The present invention further relates to a method of manually washing dishware comprising the steps of: delivering a composition according to the invention to a volume of water to form a wash solution and immersing the dishware in the solution.

DETAILED DESCRIPTION OF THE INVENTION

The compositions of the present invention provide improved sudsing volume and suds longevity when washing dishware in the diluted liquid hand dishwashing compositions, even in the presence of greasy soil and particulate soil, while also preventing unsightly residues or haziness on the washed dishes, regardless of the temperature at which the dishes have been washed.

As used herein, articles such as "a" and "an" when used in a claim, are understood to mean one or more of what is claimed or described.

The term "comprising" as used herein means that steps and ingredients other than those specifically mentioned can be added. This term encompasses the terms "consisting of" and "consisting essentially of." The compositions of the present invention can comprise, consist of, and consist essentially of the essential elements and limitations of the invention described herein, as well as any of the additional or optional ingredients, components, steps, or limitations described herein.

The term "dishware" as used herein includes cookware and tableware made from, by non-limiting examples, ceramic, china, metal, glass, plastic (e.g., polyethylene, polypropylene, polystyrene, etc.) and wood.

The term "grease" or "greasy" as used herein means materials comprising at least in part (i.e., at least 0.5 wt % by weight of the grease) saturated and unsaturated fats and oils, preferably oils and fats derived from animal sources such as beef, pig and/or chicken.

The terms "include", "includes" and "including" are meant to be non-limiting.

The term "particulate soils" as used herein means inorganic and especially organic, solid soil particles, especially food particles, such as for non-limiting examples: finely divided elemental carbon, baked grease particle, and meat particles.

The term "sudsing profile" as used herein refers to the properties of a cleaning composition relating to suds character during the dishwashing process. The term "sudsing profile" of a cleaning composition includes suds volume generated upon dissolving and agitation, typically manual agitation, of the cleaning composition in the aqueous washing solution, and the retention of the suds during the dishwashing process. Preferably, hand dishwashing cleaning compositions characterized as having "good sudsing profile" tend to have high suds volume and/or sustained suds volume, particularly during a substantial portion of or for the entire manual dishwashing process. This is important as the consumer uses high suds as an indicator that sufficient cleaning composition has been dosed. Moreover, the consumer also uses the sustained suds volume as an indicator that sufficient active cleaning ingredients (e.g., surfactants) are present, even towards the end of the dishwashing process. The consumer usually renews the washing solution when the sudsing subsides. Thus, a low sudsing cleaning composition will tend to be replaced by the consumer more frequently than is necessary because of the low sudsing level.

It is understood that the test methods that are disclosed in the Test Methods Section of the present application must be used to determine the respective values of the parameters of Applicants' inventions as described and claimed herein.

In all embodiments of the present invention, all percentages are by weight of the total composition, as evident by the context, unless specifically stated otherwise. All ratios are weight ratios, unless specifically stated otherwise, and all measurements are made at 25° C., unless otherwise designated.

Cleaning Composition

The cleaning composition is a hand dishwashing cleaning composition in liquid form. The cleaning composition is preferably an aqueous cleaning composition. As such, the composition can comprise from 50% to 90%, preferably from 60% to 75%, by weight of the total composition of water.

Preferably, the pH of the composition is from about 6 to about 14, preferably from about 7 to about 12, or more preferably from about 7.5 to about 10, as measured at 10% dilution in distilled water at 20° C. The pH of the composition can be adjusted using pH modifying ingredients known in the art.

The composition of the present invention can be Newtonian or non-Newtonian, preferably Newtonian Preferably, the composition has a viscosity of from 10 mPa·s to 10,000 mPa·s, preferably from 100 mPa·s to 5,000 mPa·s, more preferably from 300 mPa·s to 2,000 mPa·s, or most preferably from 500 mPa·s to 1,500 mPa·s, alternatively combinations thereof. The viscosity is measured at 20° C. with a Brookfield RT Viscometer using spindle 31 with the RPM of the viscometer adjusted to achieve a torque of between 40% and 60%.

Surfactant System

The cleaning composition comprises from 5% to 50%, preferably 8% to 45%, more preferably from 15% to 40%, by weight of the total composition of a surfactant system.

The cleaning composition comprises an alkyl ethoxylated nonionic surfactant. The alkyl ethoxylated nonionic surfactant of use in the invention is preferably present in the composition at a level of from 0.1% to 10%, preferably from 0.2% to 5.0%, more preferably from 0.3% to 3.0%, by weight of the total composition.

The alkyl ethoxylated nonionic surfactant can comprise a linear or branched alkyl chains, or a blend of linear and branched alkyl chains, though a blend of linear and branched alkyl chains is preferred.

The alkyl ethoxylated nonionic surfactant can have the formula:

$$R1(PO)n(EO)mOH \qquad (II)$$

wherein, in formula (II):

R1 is an alkyl chain and comprises 6 to 22 carbons, preferably 8 to 18 carbons, more preferably 10 to 15 carbons in the alkyl chain;

m is a number average of from 10 to 50, preferably from 13 to 25, more preferably from 13 to 14; and n is a number average of from 0 to 6, preferably from 0 to 2, more preferably 0, with the proviso that the ratio of m:n is greater than 2 if n is greater than 0.

The alkyl ethoxylated nonionic surfactant can comprise a linear alkyl chain. Such linear alkyl ethoxylated nonionic surfactants are typically derived from linear alkyl alcohols.

Where the alkyl ethoxylated nonionic surfactant is a linear alkyl ethoxylated nonionic surfactant, in formula (II):

R1 is a linear an alkyl chain and comprises 6 to 22 carbons, preferably 8 to 16 carbons, more preferably 10 to 15 carbons in the alkyl chain.

Preferred highly ethoxylated nonionic surfactants which are derived from linear alcohols include Genapol® C200 (C12-C18, 20 EO), Genapol® LA160 (C12-C14, 16EO) from Clariant.

Alternatively, the alkyl ethoxylated nonionic surfactant can comprise a branched alkyl chain. Branched surfactants are believed to exhibit stronger hydrophobic interactions with block-copolymers.

Suitable branched ethoxylated nonionic surfactants can be derived from guerbet alcohols or secondary alcohols. Alternatively, or in addition, suitable branched ethoxylated nonionic surfactants can be derived from primary branched alcohols, especially alcohols derived through the OXO process, the OXO process resulting a blend of linear and branched alcohols with the branching, dominantly methyl branching, predominantly being located in the C2-position.

Suitable branched ethoxylated nonionic surfactants derived from guerbet alcohols can have the formula:

(III)

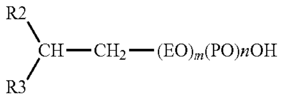

For suitable ethoxylated nonionic surfactants derived from guerbet alcohols, R1 has the formula:

(III a)

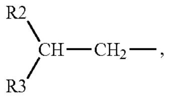

wherein:

R2 is a C3 to C11, preferably C4 to C9, more preferably C4 to C7 alkyl chain;

R3 is a C1 to C9, preferably C2 to C7, more preferably C2 to C5 alkyl chain;

with the proviso that R2 comprises 2 more carbon atoms than R3.

R2, R3 can be independently linear or branched, though linear is preferred.

Suitable branched ethoxylated nonionic surfactants derived from secondary alcohols can have the formula:

(IV)

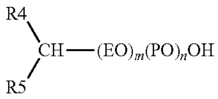

For suitable ethoxylated nonionic surfactants derived from secondary alcohols, R1 has the formula:

(IV a)

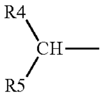

wherein:

R4 is a C4 to C11, preferably C5 to C10, more preferably C6 to C10 alkyl chain;

R5 is a C1 to C10, preferably C1 to C7, more preferably C3 to C7 alkyl chain,

R4, R5 can be independently linear or branched, though linear is preferred.

R1 can be branched. As such, R1 is selected from the group consisting of formulae (III a), formula (IV a), and mixtures thereof, more preferably R1 is selected from the group consisting of formula (IV a).

Preferred branched ethoxylated nonionic surfactants which are derived from Guerbet alcohols include Guerbet C10 alcohol alkoxylated nonionic surfactants (which are ethoxylated and optionally propoxylated) such as the commercially available Lutensol® XL series (XL140. etc). Other exemplary alkoxylated branched nonionic surfactants include those available under the trade name: Lutensol® XP140 from BASF Corporation. Lutensol® XP140 can be considered to have 14 repeating ethoxy groups.

Preferred branched ethoxylated nonionic surfactants which are derived from primary alcohols include those available under the tradenames Tergitol® 15-S, with an alkoxylation degree of from 10 to 40. For instance, Tergitol® 15-S-30 which has an average degree of ethoxylation of 30.

When propoxylation is present, the ethoxylation and propoxylation can be random or block distributed, though a block distribution is preferred. Where the ethoxylation and propoxylation are block distributed, the ethoxylation and propoxylation blocks can be in any order, though it is preferred that the propoxylation block is attached to the alkyl chain. That is, the alkyl chain is first propoxylated and then ethoxylated.

The average degree of ethoxylation (m) or propoxylation (n) is defined as the average number of moles of ethyl oxide or propyl oxide per mole of the alkyl ethoxylated nonionic surfactant.

The alkyl ethoxylated nonionic surfactant is hydrophilic and as such, has a ratio of m:n which is greater than 2, and preferably greater than 4, if the alkyl ethoxylated nonionic surfactant is also propoxylated.

For improved sudsing, the surfactant system comprises anionic surfactant. The surfactant system preferably comprises from 60% to 90% by weight of the surfactant system of the anionic surfactant. Alkyl sulphated anionic surfactants are preferred, particularly those selected from the group consisting of: alkyl sulphate, alkyl alkoxy sulphate, and mixtures thereof. More preferably, the anionic surfactant consists of alkyl sulphated anionic surfactant selected from the group consisting of: alkyl sulphate, alkyl alkoxy sulphate, and mixtures thereof.

For further improvements in sudsing, the surfactant system can comprise less than 30%, preferably less than 15%, more preferably less than 10% of further anionic surfactant, and most preferably the surfactant system comprises no further anionic surfactant. The alkyl sulphated anionic surfactant preferably has an average alkyl chain length of from 8 to 18, preferably from 10 to 14, more preferably from 12 to 14, most preferably from 12 to 13 carbon atoms. The alkyl sulphated anionic surfactant has an average degree of alkoxylation, of less than 5, preferably less than 3, more preferably from 0.5 to 2.0, most preferably from 0.5 to 0.9. Preferably, the alkyl sulphated anionic surfactant is ethoxylated. That is, the alkyl sulphated anionic surfactant has an average degree of ethoxylation, of less than 5, preferably less than 3, more preferably from 0.5 to 2.0, most preferably from 0.5 to 0.9.

The average degree of alkoxylation is the mol average degree of alkoxylation (i.e., mol average alkoxylation degree) of all the alkyl sulphate anionic surfactant. Hence, when calculating the mol average alkoxylation degree, the mols of non-alkoxylated sulphate anionic surfactant are included:

$$\text{Mol average alkoxylation degree}=(x1^*\text{alkoxylation degree of surfactant }1+x2^*\text{ alkoxylation degree of surfactant }2+\ldots)/(x1+x2+\ldots)$$

wherein x1, x2, . . . are the number of moles of each alkyl (or alkoxy) sulphate anionic surfactant of the mixture and alkoxylation degree is the number of alkoxy groups in each alkyl sulphate anionic surfactant.

The alkyl sulphate anionic surfactant can have a weight average degree of branching of more than 10%, preferably more than 20%, more preferably more than 30%, even more preferably between 30% and 60%, most preferably between 30% and 50%. The alkyl sulphate anionic surfactant can comprise at least 5%, preferably at least 10%, most preferably at least 25%, by weight of the alkyl sulphate anionic surfactant, of branching on the C2 position (as measured counting carbon atoms from the sulphate group for non-alkoxylated alkyl sulphate anionic surfactants, and the counting from the alkoxy-group furthest from the sulphate group for alkoxylated alkyl sulphate anionic surfactants). More preferably, greater than 75%, even more preferably greater than 90%, by weight of the total branched alkyl content consists of C1-C5 alkyl moiety, preferably C1-C2 alkyl moiety. It has been found that formulating the inventive compositions using alkyl sulphate surfactants having the aforementioned degree of branching results in improved low temperature stability. Such compositions require less solvent in order to achieve good physical stability at low temperatures. As such, the compositions can comprise lower levels of organic solvent, of less than 5.0% by weight of the cleaning composition of organic solvent, while still having improved low temperature stability. Higher surfactant branching also provides faster initial suds generation, but typically less suds mileage. The weight average branching, described herein, has been found to provide improved low temperature stability, initial foam generation and suds longevity.

The weight average degree of branching for an anionic surfactant mixture can be calculated using the following formula:

$$\text{Weight average degree of branching }(\%)=[(x1^*\text{ wt \% branched alcohol 1 in alcohol }1+x2^*\text{ wt \% branched alcohol 2 in alcohol }2+\ldots)/(x1+x2+\ldots)]^*100$$

wherein x1, x2, . . . are the weight in grams of each alcohol in the total alcohol mixture of the alcohols which were used as starting material before (alkoxylation and) sulphation to produce the alkyl (alkoxy) sulphate anionic surfactant. In the weight average degree of branching calculation, the weight of the alkyl alcohol used to form the alkyl sulphate anionic surfactant which is not branched is included.

The weight average degree of branching and the distribution of branching can typically be obtained from the technical data sheet for the surfactant or constituent alkyl alcohol. Alternatively, the branching can also be determined through analytical methods known in the art, including capillary gas chromatography with flame ionisation detection on medium polar capillary column, using hexane as the solvent. The weight average degree of branching and the distribution of branching is based on the starting alcohol used to produce the alkyl sulphate anionic surfactant.

The alkyl chain of the alkyl sulphated anionic surfactant preferably has a mol fraction of C12 and C13 chains of at least 50%, preferably at least 65%, more preferably at least 80%, most preferably at least 90%. Suds mileage is particularly improved, especially in the presence of greasy soils, when the C13/C12 mol ratio of the alkyl chain is at least 50/50, preferably at least 57/43, preferably from 60/40 to 90/10, more preferably from 60/40 to 80/20, most preferably from 60/40 to 70/30, while not compromising suds mileage in the presence of particulate soils.

Suitable counterions include alkali metal cation earth alkali metal cation, alkanolammonium or ammonium or substituted ammonium, but preferably sodium.

Suitable examples of commercially available alkyl sulphate anionic surfactants include, those derived from alcohols sold under the Neodol® brand-name by Shell, or the Lial®, Isalchem®, and Safol® brand-names by Sasol, or some of the natural alcohols produced by The Procter & Gamble Chemicals company. The alcohols can be blended in order to achieve the desired mol fraction of C12 and C13 chains and the desired C13/C12 ratio, based on the relative fractions of C13 and C12 within the starting alcohols, as obtained from the technical data sheets from the suppliers or from analysis using methods known in the art.

In order to improve surfactant packing after dilution and hence improve suds mileage, the surfactant system comprises a co-surfactant. Preferred co-surfactants are selected from the group consisting of an amphoteric surfactant, a zwitterionic surfactant, and mixtures thereof. The co-surfactant is preferably an amphoteric surfactant, more preferably an amine oxide surfactant. The co-surfactant is included as part of the surfactant system.

The composition preferably comprises from 0.1% to 20%, more preferably from 0.5% to 15% and especially from 2% to 10% by weight of the cleaning composition of the co-surfactant. The surfactant system of the cleaning composition of the present invention preferably comprises from 10% to 40%, preferably from 15% to 35%, more preferably from 20% to 30%, by weight of the surfactant system of a co-surfactant. The anionic surfactant to the co-surfactant weight ratio can be from 1:1 to 8:1, preferably from 2:1 to 5:1, more preferably from 2.5:1 to 4:1.

As mentioned earlier, amine oxide surfactants are preferred for use as a co-surfactant. The amine oxide surfactant can be linear or branched, though linear are preferred. Suitable linear amine oxides are typically water-soluble, and characterized by the formula R1–N(R2)(R3) O wherein R1 is a C8-18 alkyl, and the R2 and R3 moieties are selected from the group consisting of C1-3 alkyl groups, C1-3 hydroxyalkyl groups, and mixtures thereof. For instance, R2 and R3 can be selected from the group consisting of: methyl, ethyl, propyl, isopropyl, 2-hydroxethyl, 2-hydroxypropyl and 3-hydroxypropyl, and mixtures thereof, though methyl is preferred for one or both of R2 and R3. The linear amine oxide surfactants in particular may include linear C10-C18 alkyl dimethyl amine oxides and linear C8-C12 alkoxy ethyl dihydroxy ethyl amine oxides.

Preferably, the amine oxide surfactant is selected from the group consisting of: alkyl dimethyl amine oxide, alkyl amido propyl dimethyl amine oxide, and mixtures thereof. Alkyl dimethyl amine oxides are preferred, such as C8-18 alkyl dimethyl amine oxides, or C10-16 alkyl dimethyl amine oxides (such as coco dimethyl amine oxide). Suitable alkyl dimethyl amine oxides include C10 alkyl dimethyl amine oxide surfactant, C10-12 alkyl dimethyl amine oxide surfactant, C12-C14 alkyl dimethyl amine oxide surfactant, and mixtures thereof. C12-C14 alkyl dimethyl amine oxide are particularly preferred.

Alternative suitable amine oxide surfactants include mid-branched amine oxide surfactants. As used herein, “mid-branched” means that the amine oxide has one alkyl moiety having n1 carbon atoms with one alkyl branch on the alkyl moiety having n2 carbon atoms. The alkyl branch is located on the a carbon from the nitrogen on the alkyl moiety. This type of branching for the amine oxide is also known in the art as an internal amine oxide. The total sum of n1 and n2 can be from 10 to 24 carbon atoms, preferably from 12 to 20, and more preferably from 10 to 16. The number of carbon atoms for the one alkyl moiety (n1) is preferably the same or similar to the number of carbon atoms as the one alkyl branch (n2) such that the one alkyl moiety and the one alkyl branch are symmetric. As used herein “symmetric” means that $|n1-n2|$ is less than or equal to 5, preferably 4, most preferably from 0 to 4 carbon atoms in at least 50 wt %, more preferably at least 75 wt % to 100 wt % of the mid-branched amine oxides for use herein. The amine oxide further comprises two moieties, independently selected from a C1-3 alkyl, a C1-3 hydroxyalkyl group, or a polyethylene oxide group containing an average of from about 1 to about 3 ethylene oxide groups. Preferably, the two moieties are selected from a C1-3 alkyl, more preferably both are selected as C1 alkyl.

Alternatively, the amine oxide surfactant can be a mixture of amine oxides comprising a mixture of low-cut amine oxide and mid-cut amine oxide. The amine oxide of the composition of the invention can then comprises:

1. from about 10% to about 45% by weight of the amine oxide of low-cut amine oxide of formula R1R2R3AO wherein R1 and R2 are independently selected from hydrogen, C1-C4 alkyls or mixtures thereof, and R3 is selected from C10 alkyls and mixtures thereof; and
2. from 55% to 90% by weight of the amine oxide of mid-cut amine oxide of formula R4R5R6AO wherein R4 and R5 are independently selected from hydrogen, C1-C4 alkyls or mixtures thereof, and R6 is selected from C12-C16 alkyls or mixtures thereof.

In a preferred low-cut amine oxide for use herein R3 is n-decyl, with preferably both R1 and R2 being methyl. In the mid-cut amine oxide of formula R4R5R6AO, R4 and R5 are preferably both methyl.

Preferably, the amine oxide comprises less than about 5%, more preferably less than 3%, by weight of the amine oxide of an amine oxide of formula R7R8R9AO wherein R7 and R8 are selected from hydrogen, C1-C4 alkyls and mixtures thereof and wherein R9 is selected from C8 alkyls and mixtures thereof. Limiting the amount of amine oxides of formula R7R8R9AO improves both physical stability and suds mileage.

Suitable zwitterionic surfactants include betaine surfactants. Such betaine surfactants includes alkyl betaines, alkylamidobetaine, amidazoliniumbetaine, sulphobetaine (INCI Sultaines) as well as the Phosphobetaine, and preferably meets formula (II):

$$R^1—[CO—X(CH_2)_n]_x—N^+(R^2)(R_3)—(CH_2)_m—[CH(OH)—CH_2]_y—Y^-$$

wherein in formula (II),

R1 is selected from the group consisting of: a saturated or unsaturated C6-22 alkyl residue, preferably C8-18 alkyl residue, more preferably a saturated C10-16 alkyl residue, most preferably a saturated C12-14 alkyl residue;

X is selected from the group consisting of: NH, NR4 wherein R4 is a C1-4 alkyl residue, O, and S, n is an integer from 1 to 10, preferably 2 to 5, more preferably 3, x is 0 or 1, preferably 1, R2 and R3 are independently selected from the group consisting of: a C1-4 alkyl residue, hydroxy substituted such as a hydroxyethyl, and mixtures thereof, preferably both R2 and R3 are methyl, m is an integer from 1 to 4, preferably 1, 2 or 3, y is 0 or 1, and Y is selected from the group consisting of: COO, SO3, OPO(OR5)O or P(O)(OR5)O, wherein R5 is H or a C1-4 alkyl residue.

Preferred betaines are the alkyl betaines of formula (Ia), the alkyl amido propyl betaine of formula (Ib), the sulpho-betaines of formula (Ic) and the amido sulphobetaine of formula (Id):

$$R^1—N(CH_3)_2—CH_2COO^- \quad (II)$$

$$R^1—CO—NH—(CH_2)_3—N^+(CH_3)_2—CH_2COO^- \quad (IIb)$$

$$R^1—N^+(CH_3)_2—CH_2CH(OH)CH_2SO_3^- \quad (IIc)$$

$$R^1—CO—NH—(CH_2)_3—N^+(CH_3)_2—CH_2CH(OH)CH_2SO_3^- \quad (IId)$$

in which R1 has the same meaning as in formula (II). Particularly preferred are the carbobetaines [i.e. wherein Y—=COO— in formula (II)] of formulae (Ia) and (Ib), more preferred are the alkylamidobetaine of formula (Ib).

Suitable betaines can be selected from the group consisting or [designated in accordance with INCI]: capryl/capramidopropyl betaine, cetyl betaine, cetyl amidopropyl betaine, cocamidoethyl betaine, cocamidopropyl betaine, cocobetaines, decyl betaine, decyl amidopropyl betaine, hydrogenated tallow betaine/amidopropyl betaine, isostearamidopropyl betaine, lauramidopropyl betaine, lauryl betaine, myristyl amidopropyl betaine, myristyl betaine, oleamidopropyl betaine, oleyl betaine, palmamidopropyl betaine, palmitamidopropyl betaine, palm-kernelamidopropyl betaine, stearamidopropyl betaine, stearyl betaine, tallowamidopropyl betaine, tallow betaine, undecylenamidopropyl betaine, undecyl betaine, and mixtures thereof. Preferred betaines are selected from the group consisting of: cocamidopropyl betaine, cocobetaines, lauramidopropyl betaine, lauryl betaine, myristyl amidopropyl betaine, myristyl betaine, and mixtures thereof. Cocamidopropyl betaine is particularly preferred.

Preferably, the surfactant system of the composition of the present invention further comprises from 1% to 25%, preferably from 1.25% to 20%, more preferably from 1.5% to 15%, most preferably from 1.5% to 5%, by weight of the surfactant system, of a further non-ionic surfactant.

Suitable further nonionic surfactants can be selected from the group consisting of: alkoxylated non-ionic surfactant, alkyl polyglucoside (“APG”) surfactant, and mixtures thereof.

Suitable further alkoxylated non-ionic surfactants can be linear or branched alkyl alkoxylated non-ionic surfactants.

Suitable branched further alkoxylated non-ionic surfactants can be derived from primary, secondary alcohols or guerbet alcohols. Alkyl ethoxylated non-ionic surfactant are preferred. The further ethoxylated non-ionic surfactant can comprise a number average from 2 to 9, preferably from 6 to 8 units of ethylene oxide per mole of alcohol, or a number average from 2 to 9, preferably from 4 to 7 units of ethylene oxide per mole of alcohol for branched alkyl ethoxylated non-ionic surfactants. Such alkyl ethoxylated nonionic surfactants can be derived from synthetic alcohols, such as OXO-alcohols and Fisher Tropsh alcohols, or from naturally derived alcohols, or from mixtures thereof. Suitable examples of commercially available alkyl ethoxylate non-ionic surfactants include, those derived from synthetic alcohols sold under the Neodol® brand-name by Shell, or the Lial®, Isalchem®, and Safol® brand-names by Sasol, or some of the natural alcohols produced by The Procter & Gamble Chemicals company. Preferably, no further ethoxylated nonionic surfactant is present.

The compositions of the present invention can comprise alkyl polyglucoside ("APG") surfactant. The addition of alkyl polyglucoside surfactants have been found to improve sudsing beyond that of comparative nonionic surfactants such as alkyl ethoxylated surfactants. Preferably the alkyl polyglucoside surfactant is a C8-C16 alkyl polyglucoside surfactant, preferably a C8-C14 alkyl polyglucoside surfactant. The alkyl polyglucoside preferably has an average degree of polymerization of between 0.1 and 3, more preferably between 0.5 and 2.5, even more preferably between 1 and 2. Most preferably, the alkyl polyglucoside surfactant has an average alkyl carbon chain length between 10 and 16, preferably between 10 and 14, most preferably between 12 and 14, with an average degree of polymerization of between 0.5 and 2.5 preferably between 1 and 2, most preferably between 1.2 and 1.6. C8-C16 alkyl polyglucosides are commercially available from several suppliers (e.g., Simusol® surfactants from Seppic Corporation; and Glucopon® 600 CSUP, Glucopon® 650 EC, Glucopon® 600 CSUP/MB, and Glucopon® 650 EC/MB, from BASF Corporation).

Triblock Co-Polymer

The tri-block copolymers of use in the invention are preferably present in the composition at a level of from 0.1% to 5%, preferably from 0.25% to 3.0%, more preferably from 0.5% to 2.0%, by weight of the total composition.

The triblock copolymer of the present invention is defined as a triblock co-polymer having alkylene oxide moieties according to Formula (I): (E0)x(PO)y(EO)x, wherein EO represents ethylene oxide, and each x represents the number of EO units within the EO block. Each x is independently a number average between 3 and 50, preferably between 5 and 25, more preferably between 10 and 15. Preferably x is the same for both EO blocks, wherein the "same" means that the x between the two EO blocks varies within a maximum 2 units, preferably within a maximum of 1 unit, more preferably both x's are the same number of units. PO represents propylene oxide, and y represents the number of PO units in the PO block. Each y is a number average between 5 and 60, preferably between 10 and 40, more preferably between 25 and 35.

The triblock co-polymer can have a ratio of y to each x of from 0.8:1 to 5:1, preferably from 1:1 to 3:1, more preferably from 1.5:1 to 2.5:1. The triblock co-polymer can have an average weight percentage of total EO of between 30% and 50% by weight of the triblock co-polymer. As such, the triblock co-polymer can have an average weight percentage of total PO of between 50% and 70% by weight of the triblock copolymer. It is understood that the average total weight % of EO and PO for the triblock co-polymer adds up to 100%, excluding the end-caps. The end-caps are preferably hydrogen, hydroxyl, methyl, and mixtures thereof, more preferably hydrogen, methyl, and mixtures thereof, and most preferably hydrogen. The triblock co-polymer has a number average molecular weight of between 550 and 8000, preferably between 1000 and 4500, more preferably between 2000 and 3100. Number average molecular weight and compositional analysis of the co-polymer is determined using a 1H NMR spectroscopy (see Thermo scientific application note No. AN52907). It is an established tool for polymer characterization, including number-average molecular weight determination and co-polymer composition analysis.

"Block copolymers" as used herein is meant to encompass co-polymers including two or more different homopolymeric and/or monomeric units, i.e., "building blocks", which are linked to form a single polymer molecule. In this case, the block co-polymers are in the form of tri-block co-polymers. Triblock co-polymers have the basic structure ABA, wherein A and B are different homopolymeric and/or monomeric units. In this case A is ethylene oxide (EO) and B is propylene oxide (PO). Those skilled in the art will recognize the phrase "block co-polymers" is synonymous with this definition of "block polymers".

"Building Blocks" herein is meant homopolymeric units and/or monomeric units that polymerize with one another to form block co-polymers. Suitable building blocks in accordance with the present invention are alkylene oxide moieties, more particularly ethylene oxide and propylene oxide moieties. The different homopolymeric units present in block co-polymers retain some of their respective individual, original properties even though they are linked to one or more different homopolymeric units. Block co-polymers are known to exhibit properties that are different from those of homopolymers, random co-polymers, and polymer blends. The properties of block co-polymers themselves also differ depending on the length and chemical composition of the blocks making up the block co-polymer. Accordingly, the properties of a block co-polymer are influenced by the arrangement of the blocks within the block polymer. For example, a polymer such as: hydrophobic block-hydrophilic block-hydrophobic block will exhibit properties that are different than a block polymer such as: hydrophilic block-hydrophobic block-hydrophilic block. Applicant has now surprisingly found that a triblock co-polymer according to Formula (I) with the specific EO/PO/EO arrangement and respective homopolymeric lengths enhances, when co-formulated with the highly ethoxylated nonionic surfactant, suds mileage performance of a hand dishwashing liquid composition in presence of greasy soils and/or suds consistency through dilution throughout the wash process while preventing unsightly residues on dishware especially when washing at elevated temperatures. Although not wishing to be bound by theory, it is believed that these triblock co-polymers provide the right hydrophilic hydrophobic balance to position themselves at the grease-water and especially at the air-water interface. The hydrophobic PO block can nicely pack itself along the grease and especially air surface while the dual hydrophilic end tails can reach out to the water phase as such stabilizing the grease in water emulsion and especially the air in water suspension, e.g., suds, accordingly. It is believed that at elevated temperatures, the cloud point of the triblock copolymer is approached, leading to dehydration of the triblock copolymer, greater phase instability, and higher deposition of the triblock copolymer onto dishes. As a result, unsightly residues or haziness is observed on the washed dishes. Complexation of the tri-block copolymer with the highly ethoxylated nonionic surfactant is thought to inhibit this from happening.

EO-PO-EO triblock co-polymers are commercially available from BASF such as the Pluronic® PE series, and from the Dow Chemical Company such as Tergitol™ L series. Particularly preferred triblock co-polymer from BASF are sold under the tradenames Pluronic® L44 (MW ca 2200, ca 40 wt % EO), Pluronic® PE6400 (MW ca 2900, ca 40 wt % EO), Pluronic® PE4300 (MW ca 1600, ca 30 wt % EO), and Pluronic® PE 9400 (MW ca 4600, 40 wt % EO). Particularly preferred triblock co-polymer from the Dow Chemical Company is sold under the tradename of Tergitol™ L64 (MW ca 2700, ca 40 wt % EO).

The preparation method for such triblock co-polymers is well known to polymer manufacturers and is not the subject of the present invention.

Cyclic Polyamine

The composition can comprise a cyclic polyamine having amine functionalities that helps cleaning. The composition of the invention preferably comprises from about 0.1% to about 3%, more preferably from about 0.2% to about 2%, and especially from about 0.5% to about 1%, by weight of the composition, of the cyclic polyamine The amine can be subjected to protonation depending on the pH of the cleaning medium in which it is used. Preferred cyclic polyamines have the following Formula (V):

(V)

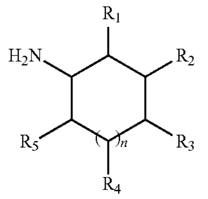

wherein $R_1$, $R_2$, $R_3$, $R_4$ and $R_5$ are independently selected from the group consisting of NH2, —H, linear or branched alkyl having from about 1 to about 10 carbon atoms, and linear or branched alkenyl having from about 1 to about 10 carbon atoms, n is from about 1 to about 3, preferably n is 1, and wherein at least one of the Rs is NH2 and the remaining "Rs" are independently selected from the group consisting of NH2, —H, linear or branched alkyl having about 1 to about 10 carbon atoms, and linear or branched alkenyl having from about 1 to about 10 carbon atoms. Preferably, the cyclic polyamine is a diamine, wherein n is 1, $R_2$ is NH2, and at least one of $R_1$, $R_3$, $R_4$ and $R_5$ is CH3 and the remaining Rs are H.

The cyclic polyamine has at least two primary amine functionalities. The primary amines can be in any position in the cyclic amine but it has been found that in terms of grease cleaning, better performance is obtained when the primary amines are in positions 1,3. It has also been found that cyclic amines in which one of the substituents is —CH3 and the rest are H provided for improved grease cleaning performance.

Accordingly, the most preferred cyclic polyamine for use with the cleaning composition of the present invention are cyclic polyamine selected from the group consisting of: 2-methylcyclohexane-1,3-diamine, 4-methylcyclohexane-1,3-diamine and mixtures thereof. These specific cyclic polyamines work to improve suds and grease cleaning profile through-out the dishwashing process when formulated together with the surfactant system of the composition of the present invention.

Additional Ingredients:

The composition of the present invention may further comprise at least one active selected from the group consisting of: i) a salt, ii) a hydrotrope, iii) an organic solvent, and mixtures thereof.

Salt:

The composition of the present invention may comprise from about 0.05% to about 2%, preferably from about 0.1% to about 1.5%, or more preferably from about 0.5% to about 1%, by weight of the total composition of a salt, preferably a monovalent or divalent inorganic salt, or a mixture thereof, more preferably selected from: sodium chloride, sodium sulphate, and mixtures thereof. Sodium chloride is most preferred.

Hydrotrope:

The composition of the present invention may comprise from about 0.1% to about 10%, or preferably from about 0.5% to about 10%, or more preferably from about 1% to about 10% by weight of the total composition of a hydrotrope or a mixture thereof, preferably sodium cumene sulphonate.

Organic Solvent:

The composition can comprise from about 0.1% to about 10%, or preferably from about 0.5% to about 10%, or more preferably from about 1% to about 10% by weight of the total composition of an organic solvent. Suitable organic solvents include organic solvents selected from the group consisting of: alcohols, glycols, glycol ethers, and mixtures thereof, preferably alcohols, glycols, and mixtures thereof. Ethanol is the preferred alcohol. Polyalkyleneglycols, especially polypropyleneglycol, is the preferred glycol.

Adjunct Ingredients

The cleaning composition may optionally comprise a number of other adjunct ingredients such as builders (preferably citrate), chelants, conditioning polymers, other cleaning polymers, surface modifying polymers, structurants (such as hydrogenated castor oil or microfibrous cellulose), emollients, humectants, skin rejuvenating actives, enzymes, carboxylic acids, scrubbing particles, perfumes, malodor control agents, pigments, dyes, opacifiers, pearlescent particles, inorganic cations such as alkaline earth metals such as Ca/Mg-ions, antibacterial agents, preservatives, viscosity adjusters (e.g., salt such as NaCl, and other mono-, di- and trivalent salts) and pH adjusters and buffering means (e.g. carboxylic acids such as citric acid, HCl, NaOH, KOH, alkanolamines, carbonates such as sodium carbonates, bicarbonates, sesquicarbonates, and alike).

Method of Washing

The invention is further directed to a method of manually washing dishware with the composition of the present invention. The method comprises the steps of delivering a composition of the present invention to a volume of water to form a wash solution and immersing the dishware in the solution. The wash solution is preferably at a temperature of greater than 30° C., more preferably greater than 35° C., most preferably greater than 40° C. The wash solution is typically at a temperature of less than 70° C., more typically less than 60° C. The dishware is to be cleaned with the composition in the presence of water. Optionally, the dishware can be rinsed. By "rinsing", it is meant herein contacting the dishware cleaned with the process according to the present invention with substantial quantities of appropriate solvent, typically water. By "substantial quantities", it is meant usually about 1 to about 20 L, or under running water.

The composition herein can be applied in its diluted form. Soiled dishware is contacted with an effective amount, typically from about 0.5 mL to about 20 mL (per about 25 dishes being treated), preferably from about 3 mL to about 10 mL, of the cleaning composition, preferably in liquid form, of the present invention diluted in water. The actual amount of cleaning composition used will be based on the judgment of the user and will typically depend upon factors such as the particular product formulation of the cleaning composition, including the concentration of active ingredients in the cleaning composition, the number of soiled dishes to be cleaned, the degree of soiling on the dishes, and the like. Generally, from about 0.01 mL to about 150 mL, preferably from about 3 mL to about 40 mL of a cleaning composition of the invention is combined with from about 2,000 mL to about 20,000 mL, more typically from about 5,000 mL to about 15,000 mL of water in a sink. The soiled dishware are immersed in the sink containing the diluted cleaning compositions then obtained, before contacting the soiled surface of the dishware with a cloth, sponge, or similar cleaning implement. The cloth, sponge, or similar cleaning implement may be immersed in the cleaning composition and water mixture prior to being contacted with the dishware, and is typically contacted with the dishware for a period of time ranged from about 1 to about 10 seconds, although the actual time will vary with each application and user. The contacting of cloth, sponge, or similar cleaning implement to the dishware is accompanied by a concurrent scrubbing of the dishware.

EXAMPLES

EO-PO-EO triblock copolymers have a cloud point which corresponds to the temperature at which polymer dehydration and consequently aggregation has reached a critical level at which the polymer phase separates. As a result, while such triblock copolymers provide sudsing benefits from hand dishwashing compositions, they can give rise to an increase in polymer residues on dishware at elevated wash temperatures. Moreover, because of the hydrophobic nature of such dehydrate aggregates, such deposits also increase soil redeposition during the wash.

To evaluate the block copolymer deposition and aggregation behaviour, the polymer diffusion coefficients were measured using diffusion NMR (also referred to as Diffusion Ordered Spectroscopy—DOSY). To isolate the effect of the alkyl ethoxylated nonionic surfactant on the triblock copolymer diffusivity at elevated temperatures, the triblock copolymer and alkyl ethoxylated nonionic surfactant were added to water with a hardness of 2.7 mmol/L Ca/Mg ions (15° D) as shown in Table 2.

TABLE 2 aqueous compositions with a water hardness of 15° D

| | Ex. I | Ex. II | Ex. III | Ex. IV* | Ex. V* |
|---|---|---|---|---|---|
| $EO_{13}$-$PO_{30}$-$EO_{13}$[1] | 1 | 0.7 | 0.7 | 0.7 | 0.7 |
| Tergitol ® 15-S-30[2] | — | 0.22 | — | — | — |
| Ecosurf ® EH-14[3] | — | — | 0.3 | — | — |
| Ecosurf ® SA7[4]* | — | — | — | 0.3 | — |
| Lutensol ® CS6250[5]* | — | — | — | — | 0.3 |

*Comparative

[1]Tergitol ® L64E, supplied by DOW

[2]Secondary Alcohol Ethoxylate having an average degree of ethoxylation of 30, supplied by DOW

[3]2-ethyl-1-hexanol which has been lightly propoxylated and ethoxylated to an average degree of ethoxylation of about 14, supplied by DOW

[4]Linear alkoxylated alkyl alcohol having an average degree of propoxylation of from 3 to 4 and an average degree of ethoxylation of 7, supplied by DOW

[5]Linear ethoxylated alcohol having an average degree ethoxylation of 5, supplied by DOW For the diffusion NMR measurements, a Bruker Avance III 400 MHz NMR spectrometer equipped with a Prodigy z-gradient cryoprobe was used, using the Bruker "Dynamics Center" software version 2.5.5.

The Pulsed Gradient STimulated Echo (PGSTE) methodology was used instead of the Pulsed-field Gradient Spin Echo (PGSE), since the dependence of the PGSE sequence on the transversal relaxation (T2) precludes its application to systems with broad line widths such as found with polymers studied at relatively low temperature. The standard Bruker pulse sequence ledbpgppr2s, which is the Wu (1995) sequence—a Bipolar Pulse Pair STimulated Echo (BPPSTE) sequence, with pre-saturation during the relaxation delay, the time for diffusion and the LED delay, was used. The BPPSTE sequence with pre-saturation of the water signal was used for the diffusion measurements to reduce the effect of inhomogeneous background gradients (see D. Wu, A. Chen, C. S. Johnson Jr., "An improved diffusion-ordered spectroscopy experiment incorporating bipolar-gradient pulses", J. Magn. Reson. A 115 (1995) 260-264) and the insertion of a supplementary delay at the end attenuated the longitudinal eddy current effects (LED). The stimulated echo with bipolar pulse pair was used to dephase the nuclear magnetization and rephase it after the diffusion encoding delay. The length of these gradient pulses were 3 ms. The $\pi/2$ pulses after the bipolar gradients transferred magnetization on the z-axis, thus reducing T2 relaxation, and allowing spoiler gradients of 600 μs to be applied. A LED delay of 5 ms was used to allow eddy currents from the gradients to subside. A diffusion period of 100 ms was used.

2D-DOSY spectra were obtained by incrementing the gradient strengths on a series of 1D experiments and by fitting the experimental signal attenuation to the Stejskal-Tanner equation, as is known by people skilled in the art. 16 linearly-spaced gradient values were used ranging from 5%-95% of 10 A current from a GREAT 3/10 amplifier, with a resulting gradient strength of 5 Gauss/cm/A.

The molar average diffusion coefficients, measured at 55° C. and expressed in $m^2/s$ for the triblock copolymer of compositions Ex. I-V, based on a bimodal fit of the echo decay of the methyl group in the PO units of the copolymer, and as calculated using the Bruker "Dynamics Center" software version 2.5.5, were measured and shown in Table 3. A bimodal fit of the echo decay was chosen to better fit the echo decay and can be considered as a simple approximation for the non-monomodal echo decay of the triblock copolymer in water. The weighted average diffusion coefficient ($D_{weighted\ average}$) of the two modes was calculated from the two diffusion coefficients ($D_{fast}$, $D_{slow}$), based on the relative fractions obtained from the bimodal fit of the echo decay at 55° C.

TABLE 3

Weighted average diffusion coefficient of the EOPOEO triblock copolymer in the aqueous solutions at 55° C. is given below:

| | Ex. I | Ex. II | Ex. III | Ex. IV* | Ex. V* |
|---|---|---|---|---|---|
| Ethoxylated cosurfactant | — | Tergitol ® 15-S-30[2] | Ecosurf ® EH14[3] | Ecosurf ® SA7[4] | Lutensol ® CS6250[5] |
| $D_{slow}$ [$10^{-10}$ $m^2/s$] | 0.68 | 0.99 | 0.97 | 0.47 | 0.83 |
| Fraction $D_{slow}$ [%] | 60% | 69% | 70% | 72% | 75% |
| $D_{fast}$ [$10^{-10}$ $m^2/s$] | 2.31 | 2.58 | 2.46 | 1.96 | 2.20 |
| Fraction $D_{fast}$ [%] | 40% | 31% | 30% | 28% | 25% |
| $D_{weighted\ average}$ [$10^{-10}$ $m^2/s$] | 1.33 | 1.48 | 1.42 | 0.89 | 1.17 |
| Change in $D_{weighted\ average}$ | =ref | +11% | +6% | −33% | −12% |

*Comparative

As can be seen from the results in Table 3, the alkyl ethoxylated nonionic surfactants of use in the present invention increase (examples II and III) the diffusivity of the EOPOEO triblock copolymer, which is evidence of reduced polymer dehydration and aggregation in the wash solution. In contrast, alternative ethoxylated nonionic surfactants, having a degree of ethoxylation of less than 10 (comparative examples IV and V) resulted in a reduction in the diffusivity, which is evidence of greater dehydration and aggregation in the wash soloution.

The following examples are provided to further illustrate the present invention:

| As 100% active | Ex 1 wt % | Ex 2 wt % | Ex 3 wt % | Ex 4 wt % | Ex 5 wt % |
|---|---|---|---|---|---|
| C1213AE0.6S (Avg. branching: 33%) | 20.4% | 15.0% | 20.4% | 20.4% | 15.0% |
| $C_{12-14}$ dimethyl amine oxide | 6.8% | 7.5% | 6.8% | — | — |
| Cocoamidopropyl betaine | — | — | — | 6.8% | 7.5% |
| Alkoxylated polyethyleneimine[6] | 1% | 0.5% | 0.3% | 0.5% | 0.5% |
| $EO_{13}$-$PO_{30}$-$EO_{13}$[1] | 1% | 1.5% | — | 1% | — |
| $EO_{11}$-$PO_{21}$-$EO_{11}$[7] | — | — | 0.8% | — | — |
| $EO_5$-$PO_{19}$-$EO_5$[8] | — | — | — | — | 1% |
| Tergitol ® 15-S-30[2] | — | 0.2 | — | — | 0.3 |
| Tergitol ® 15-S-20[9] | 0.5 | — | — | — | — |
| Ecosurf ® EH-14[3] | — | — | 0.3 | — | — |
| Lutensol ® XL140[10] | — | — | — | 0.4 | — |
| Ethanol | 2.0% | 1.0% | 2.0% | 2.0% | 2.0% |
| NaCl | 0.7% | 1.0% | 1.0% | 0.7% | 0.7% |
| Polypropyleneglycol (MW2000) | 0.7% | — | 0.7% | 0.7% | 0.7% |
| Water + Minor ingredients (perfume, dye, preservatives) | Balance to 100% | Balance to 100% | Balance to 100% | Balance to 100% | Balance to 100% |
| pH (at 10% product concentration in demineralized water - with NaOH trimming) | 9.0 | 9.0 | 9.0 | 9.0 | 9.0 |

[6]Polyethyleneimine with PEI backbone MW of 600 and 24EO and 16PO units per alkoxylation chain, supplied by BASF

[7]Pluronic ® L44, supplied by BASF

[8]Pluronic ® PE4300, supplied by BASF

[9]Secondary Alcohol Ethoxylate having an average degree of ethoxylation of 20, supplied by DOW

[10]2-propyl-1-heptanol having an average degree of propoxylation of from 1 to 1.5 and an average degree of ethoxylation of 14, supplied by BASF The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid hand dishwashing cleaning composition comprising:

a. from about 5% to about 50% by weight of the total composition of a surfactant system, wherein the surfactant system comprises from about 0.1% to about 10% by weight of the total composition of an alkyl ethoxylated nonionic surfactant of formula:

R1(PO)*n*(EO)*m*OH (II)

wherein: R1 is a C8 to C19 alkyl chain; m is a number average of from 13 to about 50, and n is a number average of from 1 to about 6, wherein in the alkyl ethoxylated nonionic surfactant of formula (II), R1 is branched and selected from the group consisting of:

i. R1 is (III a)

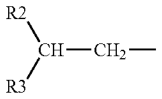

wherein

R2 is a C4 to C9 alkyl chain;

R3 is a C2 to C7 alkyl chain;

with the proviso that R2 comprises 2 more carbon atoms than R3;

ii. R1 is (IV a)

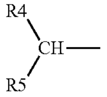

wherein:

R4 is a C4 to C11 alkyl chain;

R5 is a C3 to C7 alkyl chain; and iii. mixtures thereof; and b. from about 0.1% to about 5.0% by weight of the total composition of at least one ethyleneoxide (EO)— propyleneoxide (PO)— ethyleneoxide (EO) triblock co-polymer of Formula (I):

(EO)*x*-(PO)*y*-(EO)*x* (I)

wherein:

each x is independently a number average between about 3 and about 50; and y is a number average between 5 and 60.

2. The composition according to claim 1, wherein the composition comprises from about 0.25% to about 3.0% by weight of the total composition of the triblock co-polymer.

3. The composition according to claim 1 wherein in the at least one ethyleneoxide (EO)— propyleneoxide (PO)— ethyleneoxide (EO) triblock co-polymer of Formula (I), each x is independently a number average between about 5 and about 25; and y is a number average between about 10 and about 40.

4. The composition according to claim 1 wherein the triblock co-polymer has a ratio of y to each x of from about 0.8:1 to about 5:1.

5. The composition according to claim 1 wherein the triblock co-polymer has an average weight percentage of total EO of between about 30% and about 50% by weight of the tri-block co-polymer.

6. The composition according to claim 1, wherein the liquid hand dishwashing composition comprises from about 0.2% to about 5.0% by weight of the liquid detergent composition of the alkyl ethoxylated nonionic surfactant.

7. The composition according to claim 1, wherein R1 is selected from formula (IV a), and mixtures thereof.

8. The composition according to claim 1, wherein the liquid hand dishwashing cleaning composition comprising from about 10% to about 40% by weight of the total composition of the surfactant system.

9. The composition according to claim 1, wherein the surfactant system comprises anionic surfactant and a co-surfactant selected from the group consisting of an amphoteric surfactant, a zwitterionic surfactant and mixtures thereof.

10. The composition according to claim 9, wherein the anionic surfactant comprises alkyl sulphated anionic surfactant selected from the group consisting of: alkyl sulphate, alkyl alkoxy sulphate, and mixtures thereof.

11. The composition according to claim 10, wherein the alkyl sulphated anionic surfactant has a weight average degree of branching of more than about 10%.

12. The composition according to claim 9, wherein the co-surfactant is an amphoteric surfactant selected from amine oxide surfactant, wherein the amine oxide surfactant is selected from the group consisting of: alkyl dimethyl amine oxide, alkyl amido propyl dimethyl amine oxide, and mixtures thereof.

13. A liquid hand dishwashing cleaning composition comprising:

a. from about 5% to about 50% by weight of the total composition of a surfactant system, wherein the surfactant system comprises from about 0.1% to about 10% by weight of the total composition of an alkyl ethoxylated nonionic surfactant of formula:

R1(PO)*n*(EO)*m*OH (II)

wherein: R1 is a C8 to C19 alkyl chain; m is a number average of from greater than 25 to about 50, and n is a number average of from 0 to about 6, wherein in the alkyl ethoxylated nonionic surfactant of formula (II), R1 is branched and selected from the group consisting of:

i. R1 is (V a)

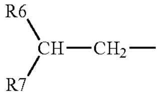

wherein

R2 is a C4 to C9 alkyl chain;

R3 is a C2 to C7 alkyl chain;

with the proviso that R2 comprises 2 more carbon atoms than R3;

ii. R1 is (IV a)

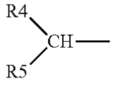

wherein:

R4 is a C4 to C11 alkyl chain;

R5 is a C3 to C7 alkyl chain; and iii. mixtures thereof; and b. from about 0.1% to about 5.0% by weight of the total composition of at least one ethyleneoxide (EO)-propyleneoxide (PO)-ethyleneoxide (EO) triblock co-polymer of Formula (I):

$$(EO)x\text{-}(PO)y\text{-}(EO)x \quad (I)$$

wherein:

each x is independently a number average between about 3 and about 50; and y is a number average between 5 and 60.

14. The composition according to claim 13, wherein the composition comprises from about 0.25% to about 3.0% by weight of the total composition of the triblock co-polymer.

15. The composition according to claim 13, wherein in the at least one ethyleneoxide (EO)— propyleneoxide (PO)—ethyleneoxide (EO) triblock co-polymer of Formula (I), each x is independently a number average between about 5 and about 25; and y is a number average between about 10 and about 40.

16. The composition according to claim 13, wherein the triblock co-polymer has a ratio of y to each x of from about 0.8:1 to about 5:1.

17. The composition according to claim 13, wherein the triblock co-polymer has an average weight percentage of total EO of between about 30% and about 50% by weight of the tri-block co-polymer.

18. The composition according to claim 13, wherein the liquid hand dishwashing composition comprises from about 0.2% to about 5.0% by weight of the liquid detergent composition of the alkyl ethoxylated nonionic surfactant.

19. The composition according to claim 13, wherein the liquid hand dishwashing cleaning composition comprising from about 10% to about 40% by weight of the total composition of the surfactant system.

20. The composition according to claim 13, wherein:

the surfactant system comprises anionic surfactant and a co-surfactant selected from the group consisting of an amphoteric surfactant, a zwitterionic surfactant and mixtures thereof;

the anionic surfactant comprises alkyl sulphated anionic surfactant selected from the group consisting of: alkyl sulphate, alkyl alkoxy sulphate, and mixtures thereof, wherein he alkyl sulphated anionic surfactant has a weight average degree of branching of more than about 10%; and the co-surfactant is an amphoteric surfactant selected from amine oxide surfactant, wherein the amine oxide surfactant is selected from the group consisting of: alkyl dimethyl amine oxide, alkyl amido propyl dimethyl amine oxide, and mixtures thereof.

* * * * *